United States Patent [19]

Brotzmann et al.

[11] 4,052,197

[45] Oct. 4, 1977

[54] PROCESS FOR MAKING STEEL FROM PIG IRON

[75] Inventors: Karl Brotzmann; Helmut Knuppel, both of Sulzbach-Rosenberg; Paul Rheinlander; Gustav Mahn, both of Wolfenbuttel, all of Germany

[73] Assignee: Stahlwerke Peine-Salzgitter AG, Peine, Germany

[21] Appl. No.: 661,061

[22] Filed: Feb. 24, 1976

[30] Foreign Application Priority Data

Feb. 25, 1975 Germany ............................ 2507961

[51] Int. Cl.² .................................................. C21C 5/34
[52] U.S. Cl. ............................................. 75/60; 75/59
[58] Field of Search ....................................... 75/60, 59

[56] References Cited

U.S. PATENT DOCUMENTS

| | | | |
|---|---|---|---|
| 2,962,277 | 11/1960 | Morrill | 75/60 |
| 3,556,775 | 1/1971 | Kuratomi | 75/46 |
| 3,706,549 | 12/1972 | Knuppel | 75/60 |
| 3,942,978 | 3/1976 | Oberg | 75/52 |

Primary Examiner—Peter D. Rosenberg
Attorney, Agent, or Firm—Lawrence I. Field

[57] ABSTRACT

A process for continuous refining in which liquid pig iron is supplied to a pig iron melt which is at least partially refined while said melt is being intensively agitated, the refining means (preferably oxygen) is introduced into the pig iron melt by means of tuyeres mounted in the refining vessel, and discharging the refining means beneath the surface of the pig iron melt, the tuyeres being positioned and the refining means being furnished so that the kinetic energy of the refining means contributes to the bath agitation. The tuyeres are preferably composite tuyeres like those described in U.S. Pat. Nos. 3,706,549 issued Dec. 19, 1972 and 3,771,998 issued Nov. 13, 1973, for discharging oxygen surrounded by a gaseous and/or liquid hydrocarbon, and possibly lime or other solid powder into the bath.

25 Claims, 3 Drawing Figures

PROCESS FOR MAKING STEEL FROM PIG IRON

The invention relates to a process and to equipment especially for the continuous preparation of steel from pig iron by blowing in refining means, preferably oxygen, below the bath surface.

Refining pig iron with industrially pure oxygen while simultaneously using cooling slag has extensively displaced conventional air and open hearth refining, principally because of the advantageous costs and superior steel quality of the refined steels. However, oxygen refining suffers from the drawback that practical processes all operate batch-wise, like the previously conventional air and open hearth refining processes. Therefore the actual efficiency will only be about 50% of convertor capacity because actual refining time amounts only to about half the time interval between two batches.

Discontinuous refining further requires interim storage of the pig iron coming from the blast furnace in a mixer and also demands costly ladle transportation between mixer and convertor and further requires discontinuous casting, corresponding to the batch sequence, of the refined steel. Batch-wise refining of steel is particularly disadvantageous in this respect, namely that present day efficient continuous casting equipment is available which will be utilized most economically only when being supplied continuously with a steel of preferably constant composition. Continuous feeding of steel for the present day conventional processes requires an almost unattainable control of the refining sequence in several convertors. Further because of lack of uniform process control, a steel supply from several convertors would result in supplying a steel varying in composition and temperature from batch to batch to the continuous casting facility. This adversely affects optimum yields with respect to quantity and quality.

Numerous proposals have been advanced for the continuous refining of pig iron in order to remedy the above cited drawbacks of discontinuous refining methods. However, none so far has found acceptance in practice. For instance, it has been suggested to refine the pig iron leaving the blast furnace in a chamber-like covered gutter or runner by blowing oxygen into the pig iron by means of lances penetrating through a gutter roof arch. But this process has failed to be satisfactory in practice because excessively long gutters are required in view of the relatively small surface of reaction or contact between pig iron and slag, and because the oxygen may be blown only at low energy. In order to increase the rate of reaction and thus to allow shortening the gutter, it has been proposed to convey the pig iron electromagnetically in a sloping gutter and in an upward direction counter-current to the slag flowing down under the influence of gravity. Besides the large equipment cost required for such a magnetic gutter, this proposal also failed to be practical because simultaneous blowing of oxygen into the electromagnetic gutter seems hardly feasible, so that the reactions in the gutter are extremely restricted.

The known "gutter" processes further suffer from the drawback that they cannot be carried out with the addition of ordinary, large piece scrap to the pig iron, but require extensive size reduction of the scrap so that it will be feasible to make appropriate scrap addition to the pig iron.

Further suggestions for continuous refining include atomizing the pig iron by means of the refining ozygen. While in such a case there will be an extraordinarily large surface of reaction, the latter merely causes rapid decarburization, because no reaction with the slag is possible during the state of atomization or during the free fall of the iron droplets. Slag reactions therefore will only occur when the preliminary refined iron droplets penetrate the slag layer located above the melt in the collecting vessel. Therefore this process amounts to a two-step process consisting of preliminary decarburization in the spray steel and of the subsequent dephosphorization and desulfurization in the manner of an open hearth process in the collecting vessel.

Lastly, another known process for continuously refining pig iron consists in supplying a chamber with pig iron and by blowing in oxygen by means of a lance while simultaneously adding lime. The kinetic energy of the oxygen jet is so adjusted that a metal slag emulsion is formed which flows off into a decanting vessel. The process is based on creating a metal slag which must be resolved however into its phases prior to casting. This is a process based on a specific slag viscosity and very time consuming: the viscosity of the slag is a function of temperature and of slag composition, but these cannot be readily controlled. Further, a low viscosity permitting easy separation of the slag and metal would hamper formation of the emulsion in the reaction chamber. The known process therefor requires a relatively long time to separate both phases, or, if there is incomplete separation or excessive slag viscosity, it will involve high iron losses because of this incomplete phase separation.

The present invention is directed to the task of providing an economical refining process for steel production, especially for continuous refining, which is characterized by a regular, largely ejection-free refining behavior, and also by high yield and especially by low iron losses. Oxygen introduced below the bath surface is preferably used as the refining medium.

The solution to this problem consists in supplying liquid pig iron to a melt of at least partly refined pig iron while the melt is being intensively stirred, and to blow jets consisting of the refining means surrounded by a protective medium, through tuyeres mounted in the refractory masonry of the refining vessel in such manner that the kinetic energy of the jets entering the melt contributes to increasing the motion of the bath in said vessel. The oxygen content of the melt may be low because the metal will be further refined in a second chamber. It is true that introducing pig iron into steel melts is considered extremely dangerous because of the high oxidation potential of the steel melt and because of the high reduction potential of the pig iron melt, and in practice one avoids casting pig iron into steel melts for these reasons. Pig iron, for instance, which is cast into a convertor conntaining a residue from a previous batch of steel may cause explosive reactions. Surprisingly, however, this danger may be avoided by supplying the pig iron to a suitable melt which is being agitated intensively, in accordance with the present invention.

By use of sufficient agitation and correspondingly metered supply of pig iron, the compositions of final bath and slag will hardly deviate from that desired despite the constant feeding of pig iron, This means: they differ in composition only slightly from conventional bath compositions for comparable refining processes.

Even though numerous processes are known for intensively agitating a steel melt, making use of the kinetic energy of the refining oxygen for this purpose has proved especially advantageous. This is so because no additional costs are incurred to agitate the bath, and because the zones of concentration and high temperatures occurring from the introduction of the oxygen are very rapidly dissipated. The oxygen is blown in through tuyeres mounted in the refractory masonry of a refining vessel and discharging below the bath surface, because in this manner the quickest, most intensive bath mixing will be obtained by means of the oxygen.

The oxygen may be introduced through bottom or side wall tuyeres and for the protection of the tuyeres is surrounded by preferably gaseous or liquid hydrocarbons as described in U.S. Pat. No. 3,706,549.

Special advantages are obtained if the pig iron is supplied to the steel melt below the metal bath surface. If this takes place in particular in the region of suction of the refining gas introduction tuyeres, then the pig iron will enter a two-phase mixture of steel and gas comprised of refining gas, carbon monoxide and protective medium. It follows that the refining actions takes place especially swiftly, all the more that the carbon monoxide generated from the carbon oxidation will also promote intensive bath agitation especially where the danger of a violent reaction is largest on account of high concentration in pig iron, the carbon monoxide acting as a lift gas.

The pig iron may be introduced from above into the intensively agitated melt, so that it is refined while it is flowing downward in opposite sense to the upward flowing oxygen. This procedure allows maximum utilization of the refining oxygen and particularly swift completion of reaction. The refined metal flows down into the slag space where the refining will be completed, that is, it will be either terminally refined or, if it is already at its final carbon content, where it will be desulfurized and/or deoxidized.

The constant feeding of fresh pig iron is related to the advantage of steady oxygen decrease on account of the carbon carried along with the pig iron. In this manner one achieves adjustment of the contents of carbon and manganese within narrow limits in the refined steel. In view of the defined final contents of oxygen, carbon and manganese of the refined steel, this allows a planned or continuous deoxidation and alloying of the steel flowing away.

Because of the continuous refining actions, the system of the invention consisting of pig iron or of bath and slag must be fed, in addition to cooling means such as fine ore and/or scrap, slag-forming agents, or desulfurizing agents, especially lime, and such agents must be fed continuously. These and other materials preferably will be blown in below the melt bath surface. An especially preferred method of addition consists in loading the refining oxygen with powdered slag-forming agents, and also with powdered ore as cooling means. The powdered slag-forming agents and/or cooling means also may be blown into the melt and/or pig iron by another carrier gas, for instance an inert one. The use of lime ($CaCO_3$) provides the especial advantage that its endothermal decomposition on one hand acts as a coolant and that on the other hand the carbon dioxide released thereby contributes to intensifying the bath agitation in the form of a lift gas.

Blowing in fine ore provides two advantages: (1) the ore acts as a coolant because of the required heat of fusion, and (2) the ore acts as an oxygen carrier and accelerates the refining reaction. In comparison to the oxygen top blowing process, the ferrous iron content of the slag in this case of oxygen being introducing below the bath surface is lower and allows blowing all of the cooling means in the form of fine ore into the melt. The ferrous oxide content of the slag does not increase or does so only insignificantly and therefore the refractory lining in the refining vessel is not endangered. Sponge iron or pre-reduced iron carriers such as pellets or scrap, the latter requiring no preparation, are suitable also as cooling agents for continuous operation of the process of the invention and provided the scrap is added, not to a pig iron melt, but to a steel melt of similar composition. The dissolution rate for large chunk scrap therefore is not as significant as in conventional converter processes in which the refining time is approximately only from 15 to 20 minutes.

The pig iron preferably being supplied continuously, the slag and/or the steel also should be preferably tapped continuously. This may be accomplished by means of a special slag chamber allowing reaction to completion and metered draining of the slag and by further feeding of the pig iron. Feeding the pig iron into the slag chamber provides the particular advantage that the pig iron first comes into contact with a slag that has largely reacted to completion. The reactive potential of the slag may be fully exhausted in this manner and above all, the final ferrous oxide content may be further decreased. Further, desulfurizing means such as calcium carbide or lime dust, for instance, may be added to the pig iron by means of a carrier gas which is preferably inert, and pre-desulfurizing may be achieved in the slag chamber. The reduction potential of the slag so created is used for temperature increase and iron reduction upon oxidizing slag contact.

It is especially important to keep the slag in the slag chamber liquid, so that the slag may be tapped from the slag chamber without difficulty and so that its oxidation potential may be utilized as much as possible to oxidize the pig iron introduced into the slag chamber. The heat required in the slag chamber for liquefying the slag is obtained from supplying a corresponding amount of refined steel from the refining chamber to said slag chamber. Therefore it will be of great importance whether the pig iron reactions on the whole are endotherm, there being the danger of excessively stiff slag if heat is not supplied from the outside. Lastly, metal and slag also may be circulated between the two chambers. The metering of the amount of steel reaching the slag chamber as heat carrier may be achieved for instance by controlling the motion of the bath or its boiling motion in the refining or reaction chamber, or merely by tilting the whole vessel, so that refined steel will flow over a partition between the reaction chamber and the slag chamber and into the slag chamber. The refined steel introduced into the slag chamber contributes to increasing the bath temperature in the slag chamber on account of its higher temperature and the higher oxygen content of the steel with respect to the pig iron being introduced causes refining of the pig iron, especially the silicon, whereby still more heat is released.

The process of the invention further includes planned decreases of the carbon content in the pig iron by feeding refined steel to the slag chamber and simultaneously introducing pig iron in said chamber and through the mixing effect of these two components and the simultaneous refining reaction based on the free and bound oxygen in the steel being introduced and the slag, before said pig iron reaches the reaction chamber. The supply of the pig iron of decreased carbon content to the reaction chamber takes place through a communicating passage between the two chambers, that is, through a passage underneath the bath surface.

Besides steel or partly refined pig iron, slag too may be made to pass from the reaction chamber into the slag chamber in order to let the only partly reacted slag react to completion. Special advantages will be obtained when the metal is made to circulate between reaction and slag chambers, the slag being drained to the outside following a short stay in the reaction chamber. The metal may be made to move from the reaction chamber into the slag chamber through openings located underneath the bath surface. In this manner it is possible to treat the metal with two different slags, for instance one acid, and one basic, or with an oxidizing slag and a reducing slag. In order to prevent formation of turbulence, the refining vessel ought to be very narrow. In order to achieve vertical circulation of the metal, the metal level in the reaction chamber may be lifted by means of a lift gas.

The quantities of the reactants which must be supplied to the melt/slag/gas-phase system of the invention may be advantageously controlled by means of a continuous analysis of the exhaust gases, especially with reference to the contents of carbon monoxide and carbon dioxide. If for instance carbon dioxide contents are too high, the rate of pig iron fed to the steel melt must be increased, while it would have to be reduced if the carbon dioxide contents are too low or else the supply of oxygen and/or ores would have to be increased.

The process of the invention preferably is carried out in equipment consisting of a refining vessel divided by a partition into two communicating chambers. One of the chambers is used as a reaction chamber from which is tapped the refined steel, while the other chamber acts as a slag chamber especially for complete reaction and tapping of the slag. The two chambers communicate with respect to the steel melt, the slag reaching the slag chamber from the reaction chamber over the partition. In this manner one obtains a kind of counter flow especially when the pig iron is wholly or in part fed to the slag chamber.

The invention will be discussed below in greater detail in conjunction with the embodiment illustrated in the drawing for the implementation of the process of the invention, in which.

Figure 1:
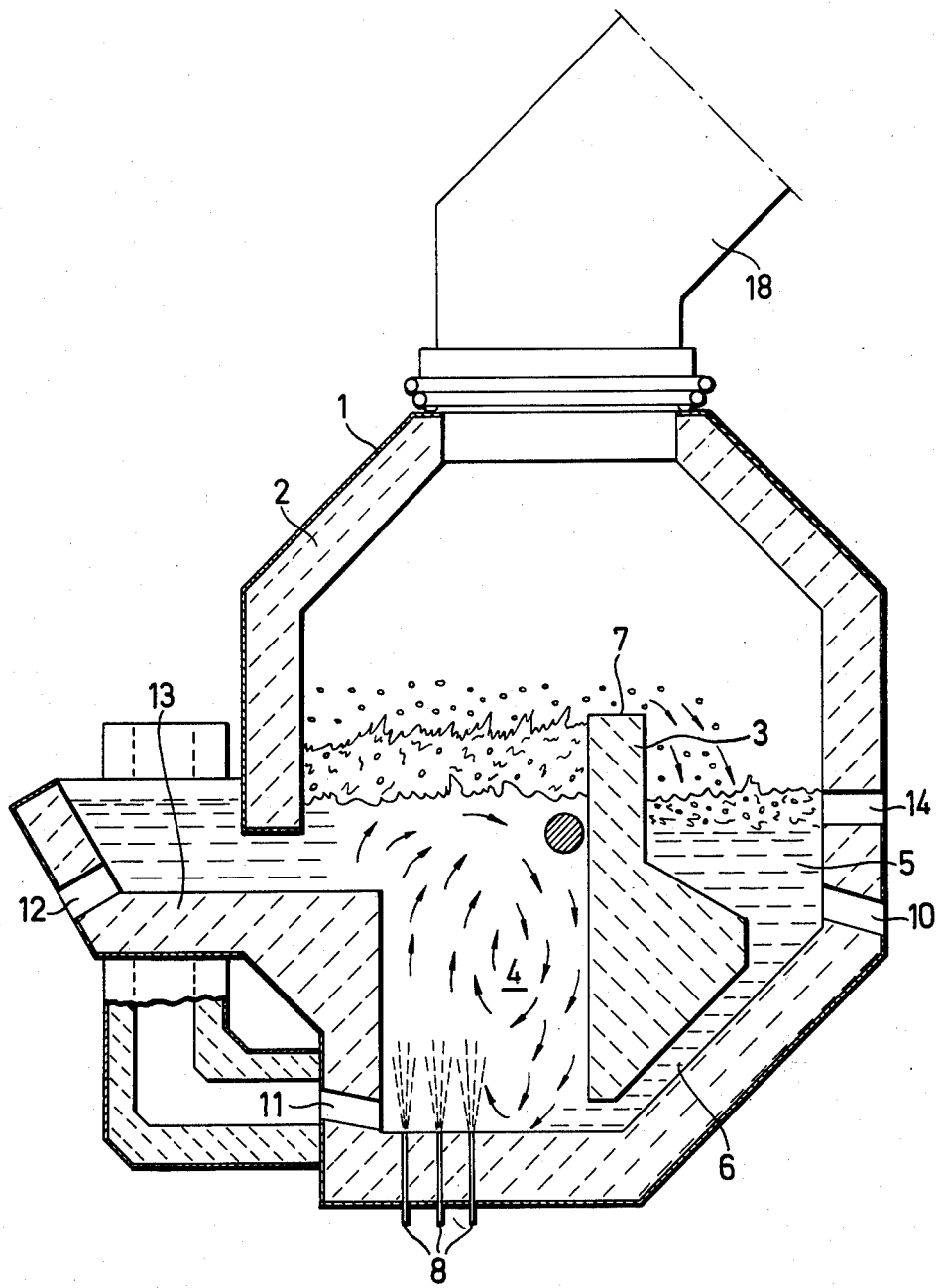
FIG. 1 is a vertical longitudinal section through the equipment of the invention along line 1—1 of FIG. 2.

The equipment of the invention consists of a vessel 1 with refractory lining 2 and a partition 3 dividing the inside of the vessel into a reaction chamber 4 and a slag chamber 5. The two chambers 4 and 5 communicate with each other, once through the bottom passage 6 for the melt and again by means of an overflow 7 for the slag and/or possibly for the steel. One or more (additional) passages may be located in partition 3 for the metal and/or the slag. Tuyeres 8 are mounted in the bottom of reaction chamber 4, which introduce the oxygen surrounded by a protective medium into the melt in the reaction chamber 4.

The pig iron is fed into the reaction chamber through a siphon-like inlet 11 in the immediate vicinity, that is in the suction range of bottom tuyeres 8 and therefore it will be simultaneously siezed by the entering oxygen and protective medium and caused to flow as shown schematically in FIG. 1. The refined steel leaves vessel 1 through a forehearth 13 provided with a drain opening 12, while the slag passes over patition 3 into slag chamber 5 and from there is drawn off through opening 14. The bottom of the forehearth extends into the reaction chamber, while the opposite part of the vessel wall 2 dips into the steel melt, so that metal and slag are cleanly separated from one another. Forehearth 13 however is not essential to the practice of the invention. It may be omitted. The refined steel in such a case then will be drawn off the slag chamber 5 of vessel 1 through drain opening 10. This possibility provides simpler design of vessel 1 and provides for draining steel and slag from the same side of the vessel. Furthermore, the steel may be drawn from the slag chamber through a forehearth similar in design for instance to forehearth 13.

Figure 3:
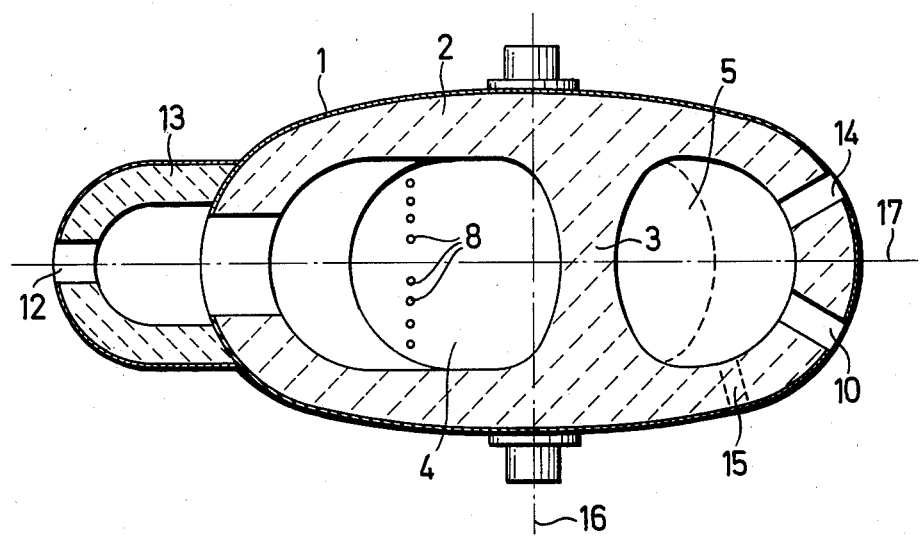
FIG. 3 is a cross section corresponding to FIG. 2 through a similar refining vessel in which the pig iron is introduced into the slag chamber.
Figure 2:
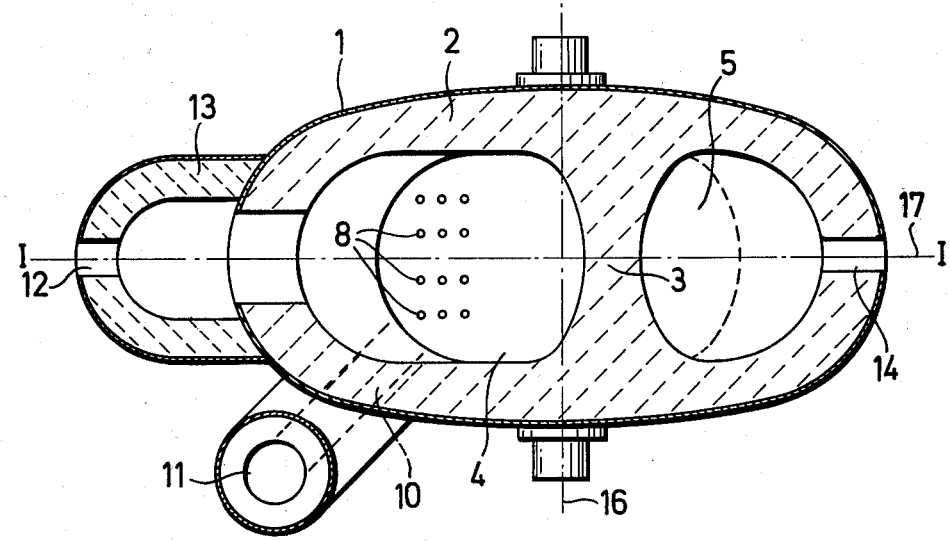
FIG. 2 is a horizontal cross section through the vessel of FIG. 1.

As shown in FIG. 3, the pig iron may be also fed through a siphon-like inlet into slag chamber 5. Especially in this case tuyeres 15 are provided in the masonry 2 of slag chamber 5 to introduce solids into the melt by means of carrier gases, these solids for instance being slag forming agents, desulfurizing agents and fine ore, in order to allow pre-treatment (especially desulfurizing) of the pig iron already in the slag chamber, before said pig iron reaches reaction chamber 4 through passage 6 and before it will be refined in said reaction chamber by the oxygen being supplied from tuyeres 8. Depending on the reaction potential of the slag in the slag chamber, the pre-treatment of the pig iron may be very extensive. This will be especially the case when oxygen is simultaneously resupplied from the steel overflowing from the refining chamber. Obviously solids may be simultaneously or exclusively blown into the reaction chamber through bottom tuyeres 8. On the other hand, the pig iron may also be supplied from above the melt or from above the slag. The latter procedure offers the advantage that the pig iron first must pass through the still reactive layer of slag and will be pre-refined in the process.

The quantities of steel and slag draining through openings 12, 14 may be easily adjusted by tilting the vessel 1 which is designed for tilting about two axes 16, 17. This vessel, which is closed, is further provided with an exhaust hood 18 for removal of the exhaust gases that may be fed to an analysis system or to an exhaust gas purification facility and/or to a heat exchanger.

Especially if there is change over in quality, the vessel of the invention is also suited for batch-wise refining. FIG. 3 illustrates equipment for such a case, pig iron being placed in slag chamber 5 via pig iron inlet with simultaneously blowing of a desulfurizing means through tuyeres 15. Such tuyeres may also be mounted in the bottom of siphon inlet 11. The pig iron following pre-treatment in slag chamber 5 passes through passage 6 into reaction chamber 4, where, possible with simultaneous blowing in of lime dust, it will be terminally refined. The slags from reaction chamber 4 and slag chamber 5 are continuously drawn off through slag opening 14. Deoxidation means and alloying agents may be added when pouring into forehearth 13. Meantime an inert gas may also be blown into the melt through tuyeres 8, 15.

The vessel may be mounted to be rotatable or tiltable about axis 16 for the purpose of emptying the melt after completion of refining and in order to have the capability of slanting the vessel during refining. This allows increasing the bath contents for a given pressure of the tuyeres and increasing the length of path of the gas in the bath. Also, the vessel may be rotatable about a second axis 17 which ordinarily will be perpendicular to the first, horizontal one. This allows adjusting the flow rates of steel and slag from the individual taps and independently from one another.

The process of the invention offers several economic advantages which in particular are achieved by consolidating three process steps ordinarily carried out in three different vessels, namely the pre-treatment of pig iron, especially its desulfurizing, then the ensuing refining of the pre-treated and possibly pre-refined pig iron, and lastly the terminal deoxidation and alloying. Transitions between the individual phases are smooth and continuous and may be adjusted to the particular composition of the pig iron and also to the desired steel composition within wide limits. This applies especially with respect to the carbon contents, which need not necessarily be reduced to very low values in the light of the feasibility of performing simultaneously dephosphorization of the pig iron with its decarburization.

We claim:

1. A process for producing steel from unrefined molten pig iron in a refining vessel which is characterized by a regular largely ejection-free refining behavior and also by high yield and by low iron losses, which process comprises:

providing a bath of partially refined pig iron in said vessel introducing a refining gas into said bath beneath the top surface of said bath by means of tuyeres mounted in the refractory masonry of the refining vessel, each such tuyere blowing a stream of refining gas surrounded by a protective medium into said bath and said gas stream rising upwardly in said bath and agitating said bath; and concurrently with the introduction of said refining gas beneath the top surface of said bath, feeding unrefined molten pig iron to be converted into steel, into said bath adjacent to the zone into which said refining gas is fed into said vessel whereby said refining gas and protective medium agitate said unrefined molten pig iron and mix the said pig iron into said bath and the kinetic energy of the refining means contributes to increasing the agitation of the bath.

2. A process as defined in claim 1 wherein the refining means is at least one stream of oxygen surrounded by gaseous hydrocarbons.

3. A process as defined by claim 1 wherein the pig iron is fed into said refined melt below the bath surface.

4. A process as defined in claim 1 wherein the pig iron is fed into the melt adjacent the region in which the tuyeres discharge into said melt.

5. A process as defined in claim 1 wherein the pig iron is fed into the melt from above and wherein it is refined while flowing downwards in opposite sense to the rising oxygen.

6. A process as defined by claim 1 including in addition blowing powdered solids into the melt underneath the bath surface.

7. A process as defined by claim 1 including in addition cooling the melt by blowing fine ore into the melt below the bath surface.

8. A process as defined in claim 1 including in addition, blowing pre-reduced iron carriers into the melt.

9. A process as defined by claim 1 including in addition, blowing desulfurizing means into the melt.

10. A process as defined by claim 1 including in addition, passing the slag from a reaction chamber into a slag chamber from which it is drawn off.

11. A process as defined in claim 10 wherein the pig iron is fed to the slag chamber.

12. A process defined by claim 1 wherein the metal melt is made to pass from the reaction chamber into the slag chamber and back into the reaction chamber.

13. A process as defined in claim 12 wherein the slag in the slag chamber is maintained at a desired temperature by addition of a suitable amount of the metal melt to the slag.

14. A process as defined by claim 1 including decarburizing the pig iron in the slag chamber with pre-refined melt and reactive slag and subsequently passing the decarburized pig iron into the reaction chamber.

15. A process as defined by claim 1 including passing metal melt through an opening in the upper part of a partition between a reaction chamber and a slag chamber and located below the metal level into the slag chamber and discharging the slag from the reaction chamber, following a short stay in the reaction chamber.

16. A process according to claim 1 wherein the quantity of reagents added to the melt is determined from an analysis of the exhaust gases.

17. A process as defined by claim 1 wherein metal and slag are made to move in opposite flows to one another.

18. A process as defined in claim 1 wherein the refining means is at least one stream of oxygen surrounded by liquid hydrocarbons.

19. A process as defined in claim 1 wherein the refining means is at least one stream of oxygen surrounded by both gaseous and liquid hydrocarbons.

20. A process as defined by claim 1 including in addition, blowing desulfurizing means into the pig iron.

21. A process as defined by claim 1 including in addition blowing desulfurizing means into both the melt and the pig iron.

22. A process as defined by claim 1 wherein the pig iron is fed continuously into said partly refined pig iron.

23. A process as defined in claim 1 wherein the pig iron is fed continuously into said partly refined pig iron and said slag is continuously drawn off.

24. A process as defined in claim 1 wherein the pig iron is fed continuously into said partly refined pig iron and said steel is continuously drawn off.

25. A process as defined in claim 1 wherein the pig iron is fed continuously into said partly refined pig iron and both said slag and said steel are each continuously drawn off.

* * * * *